United States Patent [19]

Takhar

[11] Patent Number: 5,748,765
[45] Date of Patent: May 5, 1998

[54] MODIFYING A DATABASE USING A FINGERPRINT FORM

[75] Inventor: Harinder S. Takhar, Bemidji, Minn.

[73] Assignee: Jasper Consulting, Inc., Bemidji, Minn.

[21] Appl. No.: 249,796

[22] Filed: May 26, 1994

Related U.S. Application Data

[62] Division of Ser. No. 967,166, Oct. 27, 1992, abandoned.

[51] Int. Cl.$^6$ ..................................................... G06K 9/00
[52] U.S. Cl. ................................... 382/124; 340/825.34
[58] Field of Search ........................... 382/124, 125; 340/825.31, 825.32, 825.33, 825.34, 825.3; 235/375, 380, 382, 382.5; 356/71; 283/68

[56] References Cited

U.S. PATENT DOCUMENTS

| | | | |
|---|---|---|---|
| 3,872,438 | 3/1975 | Cuttill et al. | 235/381 |
| 4,151,512 | 4/1979 | Riganati et al. | 382/125 |
| 4,210,899 | 7/1980 | Swonger et al. | 382/125 |
| 4,253,086 | 2/1981 | Szwarcbier | 382/126 |
| 4,338,025 | 7/1982 | Engel | 356/71 |
| 4,636,622 | 1/1987 | Clark | 235/380 |
| 4,747,147 | 5/1988 | Sparrow | 382/125 |
| 4,790,564 | 12/1988 | Larcher et al. | 382/125 |
| 4,891,503 | 1/1990 | Jewell | 235/380 |
| 4,993,068 | 2/1991 | Piosenka et al. | 340/825.34 |
| 4,995,086 | 2/1991 | Lilley et al. | 382/124 |
| 5,053,608 | 10/1991 | Senanayake | 235/380 |
| 5,067,162 | 11/1991 | Driscoll, Jr. et al. | 382/126 |
| 5,095,194 | 3/1992 | Barbanell | 382/124 |
| 5,144,680 | 9/1992 | Kobayashi et al. | 382/124 |

FOREIGN PATENT DOCUMENTS

| | | |
|---|---|---|
| 0 159 037 | 10/1985 | European Pat. Off. |
| 41 25 198 C1 | 5/1992 | Germany |
| 1 283 748 | 8/1972 | United Kingdom |
| WO 82/03286 | 9/1982 | WIPO |
| WO93/07584 | 4/1993 | WIPO |

OTHER PUBLICATIONS

*Publications:* Pattern Recognition, Oxford, GB; pp. 295–303, Masahiro Kawagoe and Akio Tojo 'Fingerprint Pattern Classification'.

1986 International Carnahan Conference on Security Technology, Aug. 1986 Gothenburg, SE; pp. 235–243, M.K. Sparrow et al. 'Topological Coordinate Systems: Applications in Latent Mark Matching and Image Retrieval'.

*Microprocessors and Microcomputers Hardware and Software*, 3rd Ed., pp. v, 52–57, 410–413; Ronald J. Tocci, Monroe Community College; Lester P. Laskowski, University of Texas Medical Branch, 1987 Prentice–Hall.

Patent Abstracts of Japan, vol. 17, No. 435 (P–1590), 11 Aug. 1993 & JP,A,05 089 324 (NEC Eng Ltd.) 9 Apr. 1993.

*Primary Examiner*—Leo Boudreau
*Assistant Examiner*—Jon Chang
*Attorney, Agent, or Firm*—Merchant, Gould, Smith, Edell, Welter & Schmidt Professional Association

[57] ABSTRACT

A method of modifying a database using a fingerprint form. User account information is entered into a computer database record and is marked as incomplete. A fingerprint form is then generated which pre-encodes the user account information on the form. The form is sent to the user, who places his or her fingerprints on the form before returning it. The user's fingerprints are then electronically scanned and encoded from the form and associated with the user account information stored in the computer database record. If the user's fingerprints are unreadable or illegible after electronically analyzing the form, a replacement form is automatically generated and sent to the user. If the user's fingerprints are legible, the prints are compared to all previously stored fingerprints in the computer database to determine if there is a match. If there is a match, the user record is marked as frozen and all associated users are notified. Otherwise, the user record is marked as complete.

4 Claims, 11 Drawing Sheets

INSTRUCTIONS:

TO OBTAIN CLASSIFIABLE FINGERPRINTS:

1. USE INK PAD PROVIDED.
2. PLACE THE CARD AND THE PAD ON A HARD SURFACE LIKE THE KITCHEN COUNTER OR A TABLE.
3. WASH AND DRY FINGERS THOROUGHLY OR USE THE MOIST NAPKIN PROVIDED.
4. ROLL FINGERS NAIL TO NAIL AND AVOID ALLOWING FINGERS TO SLIP BY HOLDING THE FINGER DOWN WITH THE OTHER HAND WHILE YOU ROLL IT.
5. BE SURE THE IMPRESSIONS ARE RECORDED IN THE CORRECT ORDER.
6. IF AN AMPUTATION OR OTHER SUCH DEFORMITY DOES NOT ALLOW PERFECT IMPRESSIONS MAKE A NOTATION TO THAT EFFECT IN THE APPROPRIATE BOX.
7. EXAMINE THE COMPLETED PRINTS TO SEE IF THEY CAN BE CLASSIFIED, IF NOT CALL FOR A NEW CARD.
8. DO NOT PUT ANY OTHER MARKS ON THIS CARD. IF CARD IS NOT CLEAN OR DAMAGED CALL FOR NEW CARD.

MODIFYING A DATABASE USING A FINGERPRINT FORM

This is a division of application Ser. No. 07/967,166, filed Oct. 27, 1992, now abandoned, which application are incorporated herein by reference.

FIELD OF THE INVENTION

The present invention pertains generally to a system for handling the use of personalized information bearing cards, and more particularly to a method and apparatus for preventing credit card fraud by prohibiting the unauthorized use of a credit card through verification of the absolute identity of a credit card user.

BACKGROUND OF THE INVENTION

Over the past two decades the use, acceptability, and availability of credit cards has increased dramatically in society. The convenience of use and credit availability have now made credit cards a necessity for many people, so much so that between 1980 and 1990 consumer credit card spending jumped from 201.2 billion dollars to almost 500 billion dollars. Mass mailings over the last decade helped put some 250 million Visa and Mastercard credit cards alone into households across the country in addition to over one billion other cards issued by other merchants.

Unfortunately the same convenience of use, acceptability and popularity of credit cards has also given birth to an army of fraudulent users who have caused significant losses due to the fraudulent and unauthorized use of credit cards. The costs of such fraudulent and unauthorized use to card holders, issuing institutions and the industry as a whole currently runs over one billion dollars every year.

Despite procedural safeguards and existing anti-fraud systems, credit card losses still continue for a variety of reasons:

1. Current anti-fraud systems provide verification of a credit card user only after a business transaction has occurred.
2. Current anti-fraud systems track individuals, not accounts, and thus are subject to evasion by people falsifying their identification.
3. Current systems do not track criminal activity of an individual by geography.
4. Current systems do not catch multiple credit card applications by the same person under different names. Tracking is only done by a person's name and account number.
5. Current systems do not catch counterfeit credit cards.
6. Current systems cannot stop computer hacking or dummy accounts.
7. Current systems cannot catch insider crooks.

Because of the widespread use of credit cards and the magnitude of losses caused by fraud, there is a need for an improved anti-fraud system which verifies the identity of a credit card user before a transaction takes place.

There is an additional need for a way to identify a credit card user that is not subject to evasion by a person falsifying their identification. There is a further need to catch multiple credit card applications by the same person or counterfeit cards produced by unauthorized credit card manufacturers. In addition, it is also necessary to stop computer hacking by outside parties or credit card fraud by insiders.

SUMMARY OF THE INVENTION

The present invention provides for a method and apparatus for preventing credit card fraud by prohibiting the unauthorized use of a credit card through verification of the absolute identity of a credit card user. Account information is read from the credit card and the card holder's fingerprint is scanned and electronically encoded by a fingerprint scanner. The account information and the encoded fingerprint are then sent to a remotely disposed comparitor via a communication line. The comparitor compares the scanned fingerprint with the file record fingerprint of the authorized card holder and if the fingerprints match allows the transaction to take place. If the scanned fingerprint matches the file fingerprint, the system automatically allows the transaction to complete.

DETAILED DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

The preferred embodiment of the present credit card fraud elimination system is intended to be integrated into existing credit card company data bases with the addition of a master data base to process and screen all existing customers. Once the preferred embodiment is implemented, the master data base from then on will only be used to screen new applicants and authorizations for credit. One of ordinary skill in the art will recognized that the present invention is not limited to credit card systems but may be implemented with other types of financial systems requiring the identification of individuals.

Figure 3A:
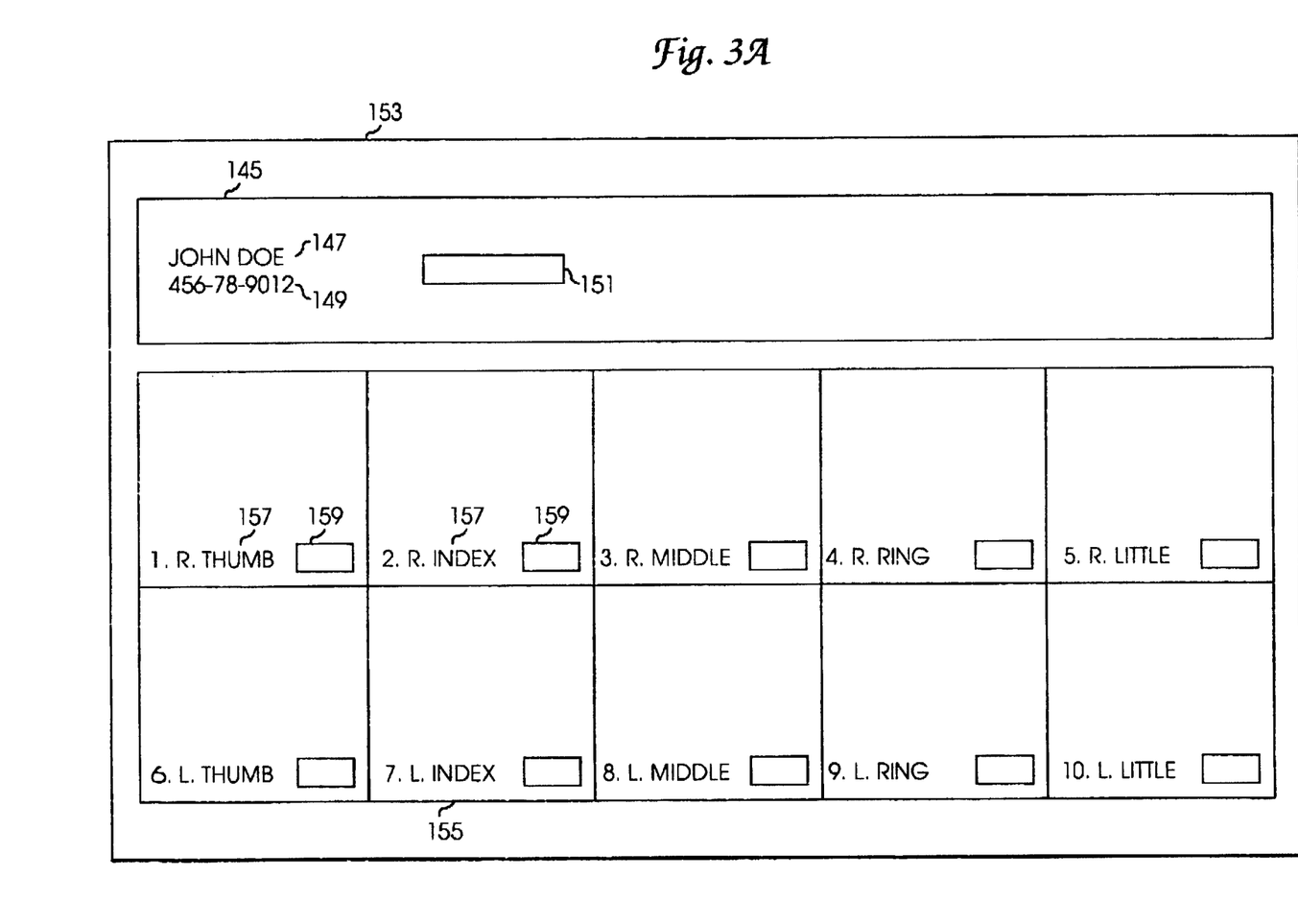
FIG. 3 is a fingerprint form and instructions compatible with the present invention.
Figure 3B:
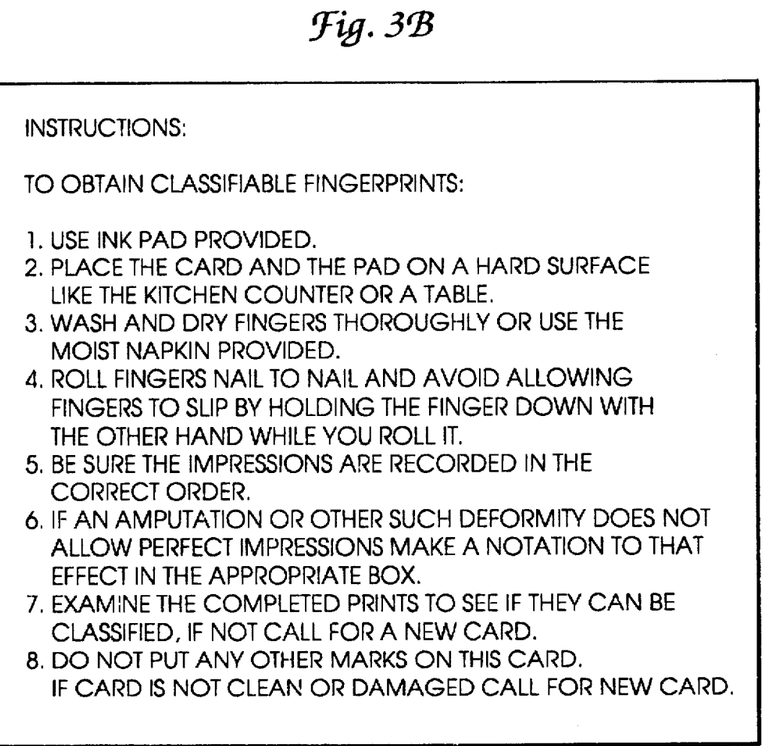

The task of obtaining fingerprints of millions of credit card users is made easier by integrating it into the existing billing and account statement cycle that are currently being used by credit card companies and financial institutions. The credit card companies and financial institutions have computers which contain the name, address, account number, and other personal information on every one of their customers billing or statement cycles. The computers every month automatically generate all the relevant information at the right times for all the right people. To obtain the fingerprints of a credit card user a special fingerprint form as shown in FIG. 3a preferably is sent out with their monthly statement. In addition, a small ink pad and moist napkin may also be provided. The fingerprint form 153 has a first information area 145 that contains, for example, the account user's name 147 and social security number 149. The first information area 145 also contains a machine readable information area 151 which contains personal information about the credit card user which may or may not be printed in the first information area 145. The machine readable format 151 may be bar code, magnetic strip, or punched holes within the card, and one with ordinary skill in the art will recognize that other machine readable implementations may be used without loss of generality. The fingerprint form 153 contains a second information area 155 which is subdivided within the area with up to ten equal spaces which correspond to areas for fingerprints of all ten fingers. Each space may be labeled with a label 157 and may also contain a machine readable code 159 which identifies which finger this fingerprint area corresponds to. The instructions for filling out the form may be printed on the back of the form substantially as shown as FIG. 3b. The space allocated for each finger may be preprinted with a machine readable code indicating which finger it is. Depending on system implementation, this eliminates human error when entering the fingerprints into the system. When the card is fed into the computer it preferably is automatically associated with the correct account file with whom the prints belong to and which prints belong to which finger. This form can be incorporated directly into the existing billing form. For instance, it may be incorporated on the bottom third portion of the form so that the customer can tear it off and mail it back with an enclosed envelope, which may also be preprinted with a machine readable code, thus allowing the return of the envelopes containing the fingerprint cards to be separated from the rest of the incoming mail.

The entire process of collecting and rostering all of the fingerprints will take anywhere from three to six months during the normal billing cycle used by the financial institution. When the fingerprint forms are mailed out with a billing cycle, there may also be included a polite letter explaining what is required of the user and suggesting that the user mail the forms back with the payment of their bill or sooner in the enclosed envelope.

The ink pad used to get the fingerprints clear and unsmudged may be especially designed for this application and is similar to the ink pads which are used widely by various law enforcement authorities. These ink pads have special black ink which is well known within the industry, which does not smudge and which leaves a very clear fingerprint if the user places the fingerprint form on a hard surface. Both the hard surface and the ink quality help insure a completely clean unsmudged print.

Since there is typically only a one time use of each ink pad, they may be especially designed to accomplish just that. In a first embodiment, the ink pads are in a form of a small patch of ink over a sufficient area on the fingerprint card. This area containing a blotch of ink is covered with a protective coating which the user peels off, exposing a patch of ink which could be used during the fingerprinting process. In a second embodiment, the ink pad is a small plate (stiff paper) which is sufficiently moist with the required ink. This plate is sealed with an appropriate covering, attached to the fingerprint form, or simply enclosed in the envelope. The customer tears or peels open the sealed package in order to expose the ink surface, uses it, and then discards the packing and the plate. Instructions may be placed on the reverse side of the fingerprint form in order to advise the customer to place the pad and the form on a hard surface such as a kitchen counter, table, or a desk and to follow the simple directions and then mail back the form in the enclosed envelope.

The moist napkin that typically is included with the fingerprint form and ink pad is similar to the ones used in various restaurants and is readily available from a variety of vendors.

The process of entering all fingerprint data into the system is fast and accurate; the alpha numeric information can either be previously stored in the computer database and linked with the fingerprint images by machine reference to the encoded information on the form, or from the individual customer account information and the fingerprints themselves, which may be simultaneously read by a machine from the same card at the same time.

Figure 12:
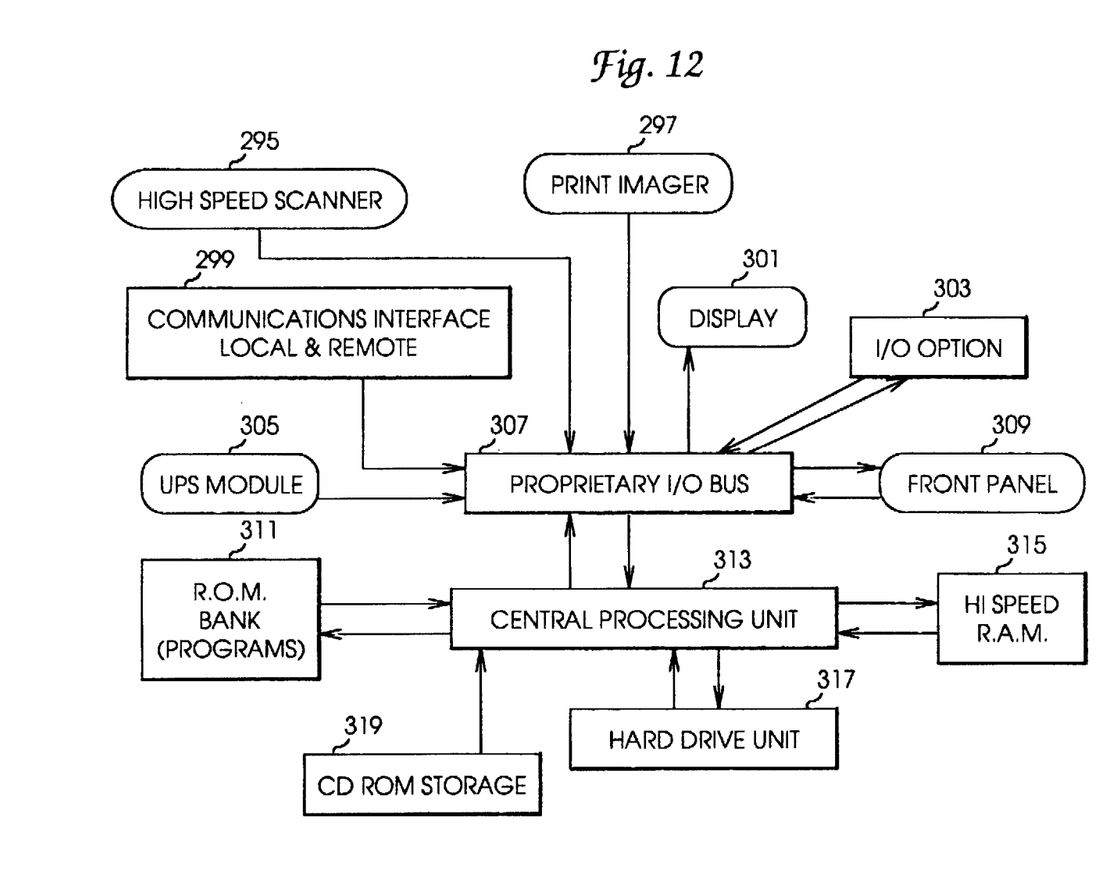
FIG. 12 is a block diagram of the schematic of a rostering apparatus compatible with the present invention.

A preferred apparatus for automatically rostering users on the system is shown in FIG. 12. A processor 313 with read only memory (ROM) 311 and high-speed random access memory (RAM) 315 connect to a data input/output (I/O) bus 307 powered by an uninterruptable power supply 305 (UPS). The processor 313 processes data going to and coming from a front panel 309, a display 301 and optional I/O devices 303. A fingerprint image scanner 297 reads an operator's fingerprint, while a communication module 299, typically comprising a modem, sends and receives information to and from remote devices via standard telephone lines, or other such communication lines. A high speed form scanner 295 reads account information and scans and electronically encodes fingerprints from a fingerprint form. The read and scanned information may be stored on mass hard disk storage 317 and compared to compact disk read only memory (CD ROM) storage 319.

The rostering apparatus typically serves as the single source of fingerprint data entry for inclusion in a client database, which is preferably used in association with verification of a customer identification at a merchant site. The rostering apparatus is preferably located in a temperature and humidity controlled environment, suitable for high speed document imaging. Data flow starts with the high speed scanner 297 serving as the input device for the customer completed fingerprint forms. Print images are scanned, digitized, and routed to the processor 313 via the data I/O bus 307. Control and data signals are clocked to the front panel 309 for operator instructions, under control of programs initially stored in ROM 311. The programs are then transferred to high speed RAM 315, whereby the processor 313 calls, transfers and manipulates all system activity. For all normal scanning functions there is no mass storage activity, which slows down the system. The use of preferably 20 nanosecond or faster RAM 315 insures minimal processor 313 wait state cycles. The data I/O bus 307 incorporates large scale caching techniques, and features a standalone, dedicated processor that serves to direct data, preferably providing the processor 313 with data at all times. The ROM 311 based programs provide the necessary protocol conversions and interfacing instructions that route and convert print data to the communication module 299, which is co-processed. This communications module 299 preferably supports direct IBM attachment, 5150, 3270 emulations, and/or Novell and UNIX connectivity.

The fingerprint imaging scanner 297 runs in parallel to high speed form scanner 295 to verify the identity of system operator personnel. The CD ROM storage unit 319 is preferably used for storing locally operator fingerprints downloaded from the main database, as well as other database information as needed. The hard disk storage 317 serves as a storage device for diagnostic and system utility programs, as well as for configuration backup files. The hard disk storage 317 is also used for storing temporary system files and serving as a buffer for communications interruptions that may occur with remote devices.

The UPS 305 is a bus preferably attached to a DC power supply that is integrated into all systems to allow for a controlled power down sequence preferably preserving all data and securing the communications link with remote devices if a power interruption occurs.

The I/O option 303 preferably is a direct bus access reserved for future enhancements such as multiple scanners, imagers, or communication ports. The display 301 accommodates multiple monitors or LCD displays. The power supply is preferably a 300 watt, 110/220 v switchable UL, CSA, TUV, FCC Approved unit. One skilled in the art will recognize that other equivalent hardware may be substituted for the above without loss of generality.

Figure 1:
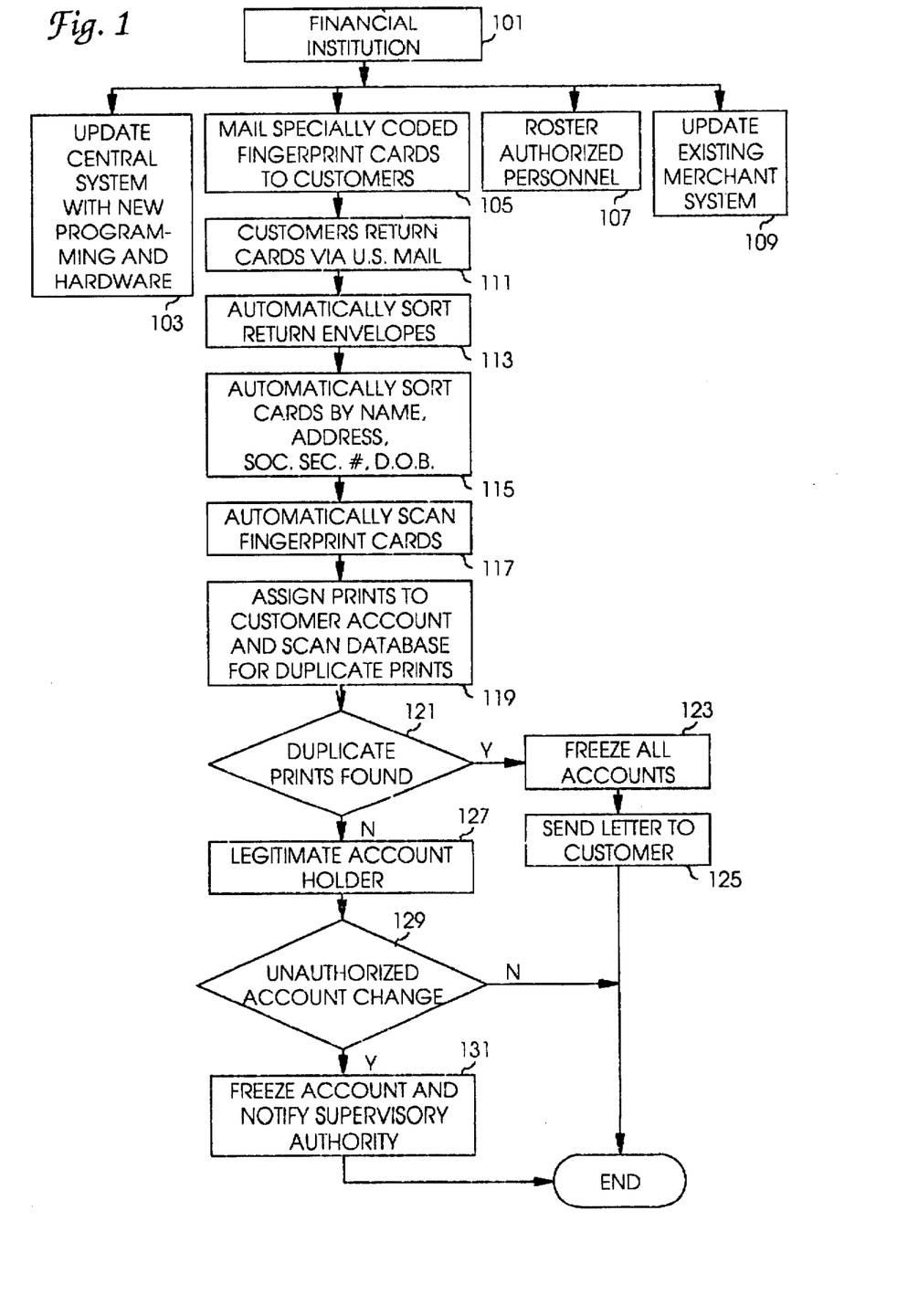
FIG. 1 is a block diagram showing a credit card fraud elimination system compatible with the present invention.

A typical process for automatically rostering users on the system is shown in FIG. 1. A financial institution 101 updates their central computer system with new software and new hardware 103, adds authorized personnel 107 and also updates the existing merchant machinery 109. The financial institution 101 mails specially encoded fingerprint forms to customers 105. Customers place their fingerprints on the forms and return them to the financial institution 101 via U.S. mail at 111. Because of the coded information on the forms, when the forms are received back at the institutions mail room, they first go through the mail sorting room equipment. Then all of the envelopes which were sent to the customers to mail the forms in will be separated at 113, since those envelopes also have on them a special machine readable code which allows them to be separated from the rest of the mail. Once the envelopes are open, the forms are fed into the scanning units, which automatically sort the forms by name, address, social security, and date of birth at 115, and the fingerprint portion of the forms are automatically scanned at 117. Once the user account information and encoded fingerprints have been read into or linked within the system, the fingerprints are assigned to the customer account at 119, and the computer data base of all previously stored fingerprints is scanned for duplicate prints at 119. If at 121 duplicate prints are found, all accounts associated with this set of fingerprints are frozen at 123, including the newly-opened user account, and a letter is sent to all of the customers at 125, informing them that there is problem with identification which must be resolved before their accounts may be used. Otherwise, if at 121 duplicate prints were not found, the determination is made at 127 that the account holder is legitimate, and the account is marked as complete. If at 129 subsequent to the establishing of a legitimate account an unauthorized account change takes place, the account is frozen at 131, and a supervisory authority is notified.

The preferred fraud prevention system (FPS) stores, scans, matches or mismatches any fingerprint image that is received by the system for purposes of authorization on a charge or for issuance of a new credit card. The preferred system design provides for the alerting of proper authorized personnel in case of a fingerprint mismatch, which eliminates and prevents the issue of a fraudulent card or any unauthorized manipulation of an existing account. In case of a new credit card or any alteration to an existing file, the credit card company employee initiating the request preferably is also included in the screening process, and no information is given or altered, and no information for a new file is saved or activated, until the employee initiating the request is also screened and verified as an authorized person. It is preferable that there is no override to this process by the employee without appropriate intervention by superiors.

Preferred database files comprise a G database file (meaning "good") and an F database file (meaning "fraudulent"). These files are used for storing and integrating all of the fingerprints obtained from all of the customers such that one or the other or both are accessed automatically any time a customer file is accessed for purposes of authorization or when a new file is being created for a new account. The G file contains scanned fingerprint imaging data of all the clients who have been issued a legitimate credit card, and typically is accessed first when authorizing a transaction or issuing a new credit card.

Figure 2:
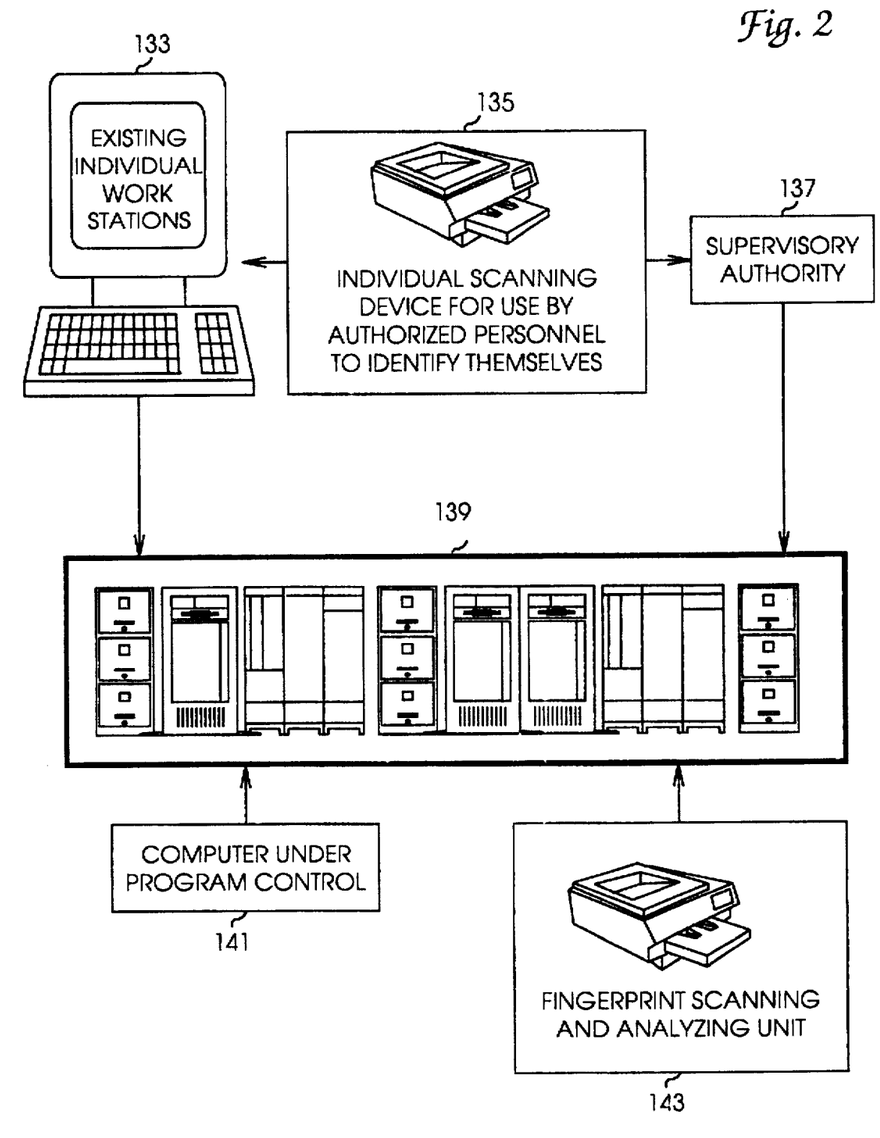
FIG. 2 is a block diagram showing a method for adding a user record to a computer database compatible with the present invention.

In the case of an application for a new credit card, as soon as all of the basic information has been entered into computer system 139 and the potential customer has been approved for a credit, but before authorization to actually print and issue the credit card has been granted, the computer software 141 preferably prompts the authorizing employee setting up the user account to scan in (input) the finger prints which have been received from the potential customer at 143 along with the fingerprint of the employee at 135 in FIG. 2. Alternatively, the fingerprint screening may be done before the rest of the approval process is performed. The prints that come from the customer and the prints from the employee typically are immediately logged on to both the G and the F files on a temporary basis, as the potential customer has not yet been screened.

Once scanned, it is preferable that neither one of these prints may be manipulated or deleted from the memory of either the FPS or the preferred absolute identification device (AID) files, the latter of which will now be discussed. In the preferred AID, both G and F files are activated to first scan the fingerprints of the file creating employee to verify if that person is a person who is authorized to create such a file. If the prints do not match with those on record for an employee who is an authorized person to be using that work-station, the entire user file that was just created preferably is deleted from the system, except that the fingerprints of the creating person typically are identified with whatever employee name was used, and such information is permanently stored in the F file as a person who attempted fraud. If their fingerprints match any fingerprints on record, the system typically then records, searches and identifies the prints of the person for whom this file is being created. At this time all system files may be searched to see if there is a match with any other person of a different name or address. If they do match after a second attempt, the user file preferably is completely erased from the system, with the exception that the fingerprints of the user record may be automatically entered into the F file. In the preferred system, the employee will not be able to close the user file and mark it as complete, even if the power to the work station 133 being used is disconnected, as the transaction has already been recorded with the G and F files. As soon as the work station 133 is turned on again, it normally returns to where it left off when power was interrupted. At the same time a second mismatch occurs, an authorized superior 137 to the employee initiating the request processing this application, is preferably automatically alerted that a fraudulent application is being attempted.

Preferably, if the user fingerprint are illegible or unclear, a supervisor 137 is notified and both the initiating employee and the supervisor employee 137 must verify by using their fingerprints that they have viewed these user fingerprints and they are legible and clear. This ensures that more than one person is aware of the problem and that all the right steps are being followed so that a legitimate person is not accidently classified as fraudulent.

If the user fingerprints are determined to be illegible, the user file may be erased from the system, and the applicant may be automatically sent a form letter along with a new fingerprint form suggesting that the person should apply again with more legible fingerprints.

Figure 6:
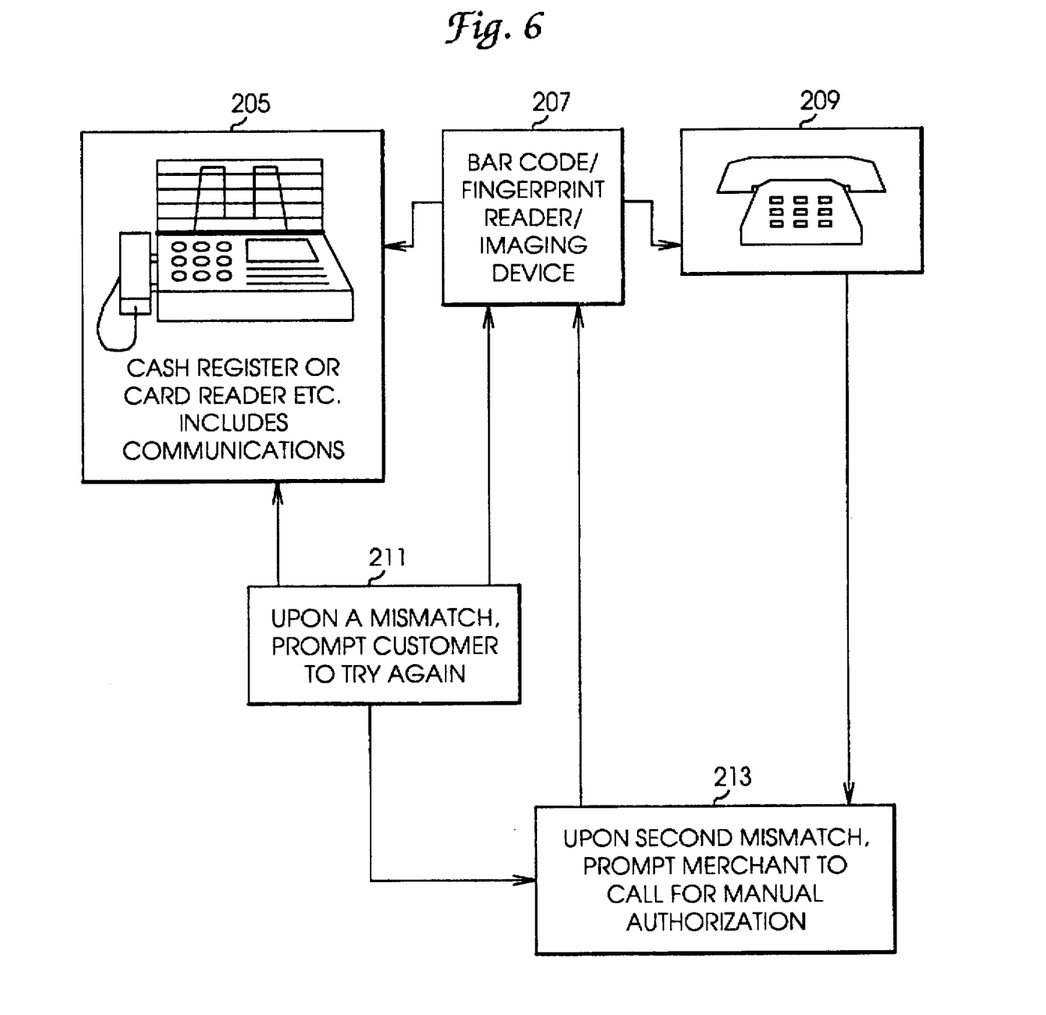
FIG. 6 is a block diagram showing a system to prevent a legitimate user from being mis-identified compatible with the present invention.

When a user file is accessed for purposes of authorization, normally the only fingerprint information being matched is that of the legitimate owner of that account stored in the form of numerical encoding associated with the user file. The preferred authorization process, shown in FIG. 6, is attempted at least twice at 211 and 213 in case of a fingerprint mismatch in order to ensure accuracy and exactness of the prints. Upon a second mismatch 213, the system disconnects and the approval of credit is denied. The merchant then calls an employee at 209 to go through the verification process manually.

Present credit cards have a magnetic strip on the back which encodes information about the account name, account number, financial institution's name and/or code, institution's federal clearing code/routing code, and other such accounting information, but nothing else about the card holder.

The preferred system provides for credit cards with additional information about the account holder and card holder (as these may be two different people or organizations) and processes the information as described below. The additional personal information relates to the name of the account holder, name of the card holder (if different), address, social security number, date of birth, and gender of the card holder. When a credit card with the additional personal information is run through a card reader unit at a merchant site, 205 of FIG. 6, the information is transferred to the client file which the merchant is accessing. First, the information is matched with that on the file, and then the fingerprint information is matched with that on this same account file. A mismatch of all five information elements and fingerprint information is highly unlikely. If however, the fingerprint information and another element of personal information do not match and the proper procedure has been followed, then it is possible that a legitimate customer is attempting a transaction and something may be wrong. At this time an operator or employee from the financial institution clearing facility may be called to assist with the transaction, just as is done under present systems. After the second attempt to match information, the merchant is prompted to call the clearing employee and the verification proceeds manually.

In the preferred system, the majority of fingerprints and corresponding account and personal information is contained in the G file, as most users will be legitimate users. However the F file is active and runs in parallel to the G file when existing client files are accessed or when a new user account is created. When any information on fingerprints is discarded from the G file, the system automatically accesses the F file and makes a record of the event and starts a search process of matching, identifying the user, and recording the final result. Normally, the G file is used during the initial processing of the application, or when an employee creating the new account is not an authorized person, or when there is a mismatch for incoming fingerprints from a merchant site, and the F file is only accessed when there is a problem.

The preferred F file acts as an archive to contain the fingerprints of all the users who in the past have committed or have attempted any fraud. The F file is also responsible for storing all the fingerprints and any corresponding relevant data of users who in the future might be committing credit card fraud.

Upon initial installation of the preferred embodiment at a merchant site, the merchant will typically enter a telephone phone number for the local law enforcement agency. Initial installation is not completed without this information or a manual override by the merchant, and the merchant equipment is inoperative until this step has been completed. Manual override may optionally be eliminated by a financial institution. As soon as this step is done and the merchant has completed other normal setup functions, merchant verification is done using the preferred AID system to verify the identity of the merchant. Only after this process has been completed is the merchant system operative.

The preferred initialization process described above may be customized for individual merchant needs by allowing the identification of each employee as well as when the equipment may be used and by whom. The merchant unit may optionally contain a mini-version of the data processing part of the preferred FPS containing fingerprints identifying each one of the employees. The system then screens employees and maintains a record of employee activities. In case of unauthorized activity by any employee, the system alerts any first available authorized superior employee who then deals with the situation appropriately. This also protects financial institutions, in that, in case an unscrupulous employee is somehow processing fraudulent charges as telephone orders or mail orders, there is a record of the employee who did it. This also eliminates a situation where a fraudulent employee attempts to use another employee's system.

Under present systems when a customer wants to charge a purchase at a merchant location, the customer presents a credit card which has information on it in the form of a magnetic strip and sometimes in the form of a human-readable account number and name on the other side. The merchant enters the account number manually or slides the card through a magnetic strip reader. This card information is then instantly relayed over present communications systems via a modem unit to a main computer database. Next, the merchant equipment has a code number (merchant number) which is either manually entered or is pre-programmed into the unit. This allows the merchant to access the main clearing computer, which then opens the customer's file containing all relevant credit information for the customer.

If the card has been reported lost or stolen at this point, the merchant would receive instructions on what to do, usually involving calling a telephone number. The merchant may be required to see some form of identification, which could be a driver's license or more credit cards. However, the identification provided by the customer may be falsified along with other credit cards, and there still is no absolute proof that the person who has made the purchase was the person authorized for such use. By the time a fraud is discovered, the purchase has already taken place, and the person responsible for the fraud has left the premises.

With the preferred AID system, a customer is required to use a finger print (instead of or in addition to a conventional signature) on a miniature imaging device, which may be attached or incorporated with the merchant equipment being used with existing systems. Therefore, assuming the customer has available credit, the customer is required to provide a fingerprint instead of or in addition to a signature as a means of identification.

Figure 4:
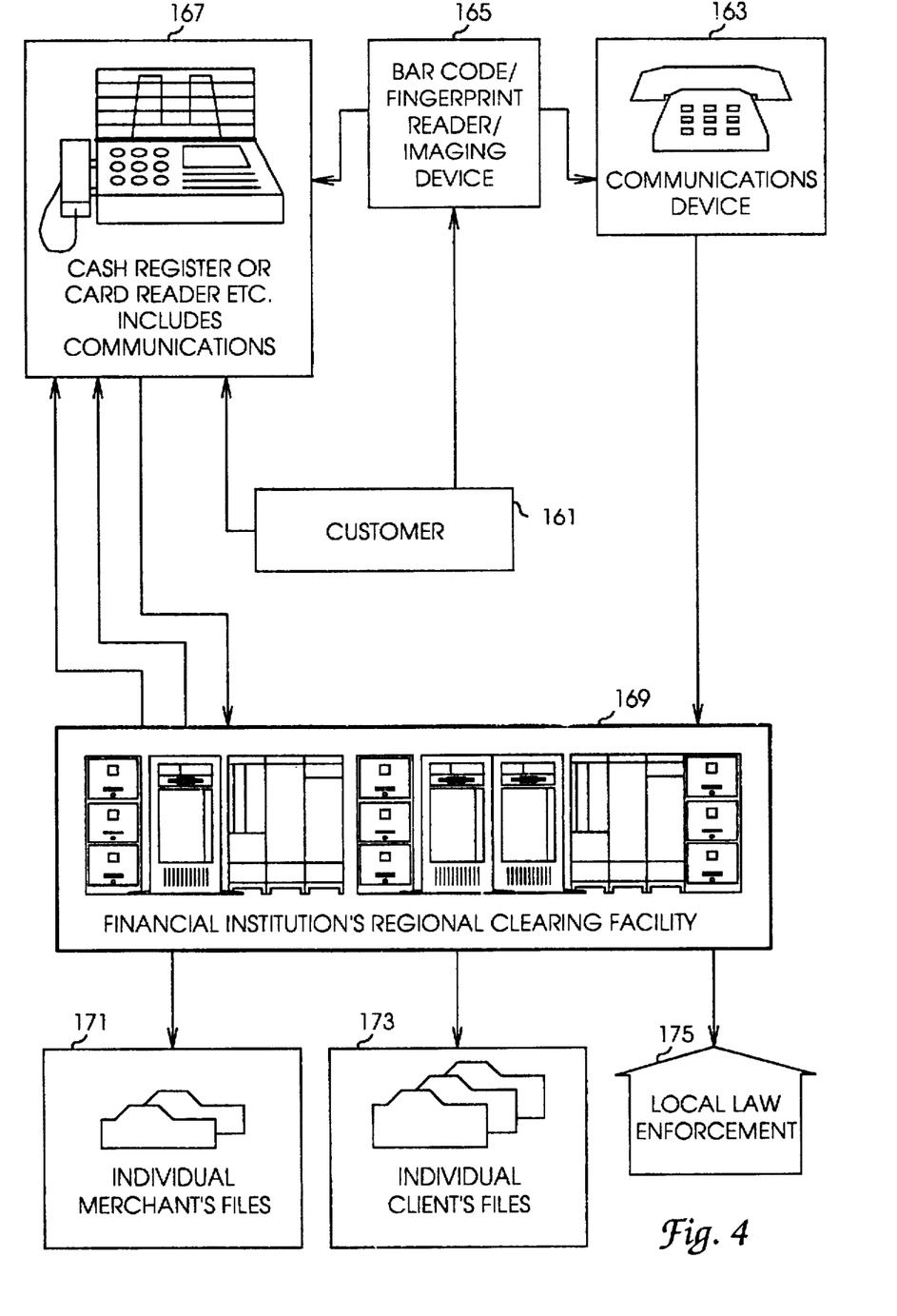
FIG. 4 is a block diagram showing a user identification system compatible with the present invention.

As shown in the preferred embodiment of FIG. 4, a fingerprint is the customer's 161 legal acceptance of the charge and the authorization for the financial institution to pay the merchant. The credit card account information is obtained on a card reader 167, and fingerprints are obtained on an imaging device as shown at 165, which converts a fingerprint image into a sequence of digitalized numerical codes, then transmits this data, through the existing communication device and network 163 to the main computer 169 and stores the data in the database files 171 and 173. Within the main database, the client file 173 is opened, and the fingerprint information obtained at the merchant site is received at the main database and compared to the set of fingerprints stored with the client file.

If the imaged fingerprint is clear and legible, the imaging device preferably issues an audible signal and converts the fingerprint into numerical codes. If the imaging device does not recognize a fingerprint image because the fingerprint is smudged or unclear, the customer typically cleans his or her fingers with a provided moist napkin, the merchant cleans the imaging surface, and the customer then repeats the fingerprint imaging process.

Upon a mismatch the second time, or when an operator has been notified, the preferred system without any further commands or action closes the client file without saving anything that may have been altered, but retains the fact that the user file was accessed. If the merchant follows the directions which were given after the first attempt and attempts to obtain authorization again, the system repeats the verification process, and if the fingerprint image matches, the authorization is given as normal, and the previously stored information about the mismatch is erased. The retry attempt preferably comes within a reasonable time frame, typically within 30 minutes, from the first attempt and is initiated from the same merchant location. In no other instance will the preferred system permit the retry attempt.

If there is still a mismatch of fingerprints and the retry attempt is within the preferred time frame at the same merchant site, the employee at the institution talks to the merchant and the customer to establish what is wrong and ensures that the fingerprinting process is being followed properly. If the identification process still comes up with a mismatch, the authorization is dealt with by the employee manually, but law enforcement officials are not normally notified. The system preferably retains records of the incident along with all relevant information about it.

If the same incident with the same customer at the same merchant location or any other merchant location happens again, law enforcement officials preferably are notified automatically and immediately at 175, FIG. 4. The speed and accuracy of this notification is possible because the preferred FPS file contains a temporary, time controlled "note pad" file which is individual for every regional clearing facility. This preferred note pad file contains records of all mis-matched fingerprints for any given predetermined continuous period of time, after which the information for the preceding predetermined period of time is erased, thus allowing the note pad to carry a perpetual record of continuing mismatches for any predetermined period of time. For example, a financial institution may wish to keep track of mismatches for a period of typically 15 days at a time. Authorized personnel set the note pad to erase note pad entries 15 days after they have been logged. After the fifteenth day, the first of the days may be dropped off, providing a perpetual fifteen day cycle. The cycle can be changed at any given time and for any given geographic area. The default note pad cycle is typically seven days, with a minimum value of one day.

The note pad is active and runs concurrently with the G file and F file. The purpose of the note pad file is to provide a log of mismatched fingerprints for a given number of days in a given geographic area. During the first attempt at a given merchant site, if there is mismatch on an account and there is a record of a similar incident with the same fingerprint in the note pad, the preferred note pad inhibits any further action and instructs the main system to close the account file, notify local law enforcement officials, and deny authorization. The note pad does not add significantly to the time required to process a transaction because there are typically not many mismatched prints to compare at any one time. If there is a high number of mismatched prints in a geographic area, the financial institution can control the size of the note pad by changing the number of days the note pad tracks.

If after checking the note pad it is found there is no record of any fraudulent activity, the system continues to process the transaction normally.

Information which is being erased out of the note pad after the predetermined period of time is used to update the F file. This note pad information supersedes any previously recorded information. A financial institution may optionally set the note pad to automatically back up all information that is being erased.

Figure 5:
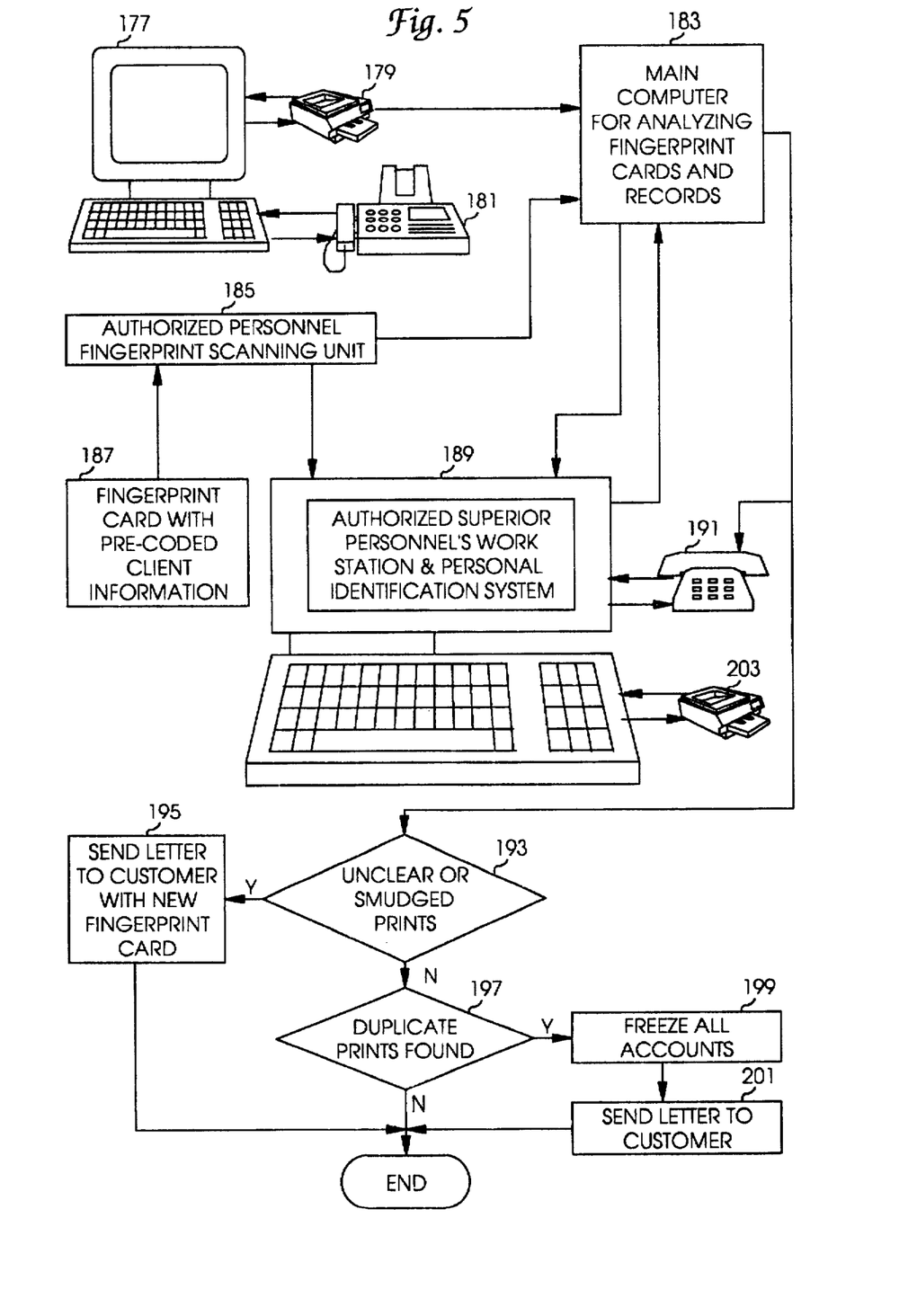
FIG. 5 is a block diagram showing a fingerprint mismatch method compatible with the present invention.

Financial institutions typically have already sorted and stored client files on the basis of account numbers and the name and address of each individual card holder. In the preferred system, also added into the institution's existing computer network is a fingerprint analysis and identification device, much like the one presently being used by law enforcement agencies such as the U.S. Federal Bureau of Investigation, with a large capacity and capable of scanning a large volume of fingerprints. The fingerprints which are scanned by these units or the ones at the merchant site cannot be manipulated fraudulently in any way. FIG. 5 shows how the preferred analysis unit 183 reads a fingerprint from a fingerprint form 187 and translates and sends a message to the receiving FPS and AID database 189 via communications device 191. The FPS and AID processing units temporarily store the converted information in the G file. The preferred screening process starts with a system check for unclear or smudged prints at 193. If the prints are not legible, a letter is typically sent to the user at 195 explaining the problem along with another fingerprint form to fill out. The preferred screen process then looks for a match of the scanned fingerprints with previously recorded fingerprints at 197 to see if there is already a record of the fingerprints under a different name. If there is a match, then all information is logged in the F file, the accounts are frozen at 199, the accounts users are sent a letter at 201 explaining the problem along with another fingerprint form to fill out, and the information is permanently stored in the G file with the appropriate user record. Before the scanning unit starts the conversion of any finger print card that has been inserted for that purpose, the preferred system asks the operator to verify if the prints being requested for scanning are clear and legible prints. The operator provides verification, then in the case of a new application provides his or her own fingerprint.

Further preferred features of the present system follow below. During initial set up where fingerprints are being read from the customer returned fingerprint forms, it is not necessary to screen the operator on every fingerprint, since it is known they have been received from a customer. A fingerprint form that does not have specific customer information coded on it will not be accepted by the system. During the initial data entry stage, an operator is only required to provide identity verification at the time they start a session at their work station 133. If a work station 133 is left unattended for previously specified period of time, the work station 133 disconnects from the system and the operator is once again required to provide identity verification. Separate from this verification of the operator, there is a random operator verification during the time the system is being used to input data. Operator verification is required on every new application or at any time when an existing client file has been manipulated.

During the time when initial fingerprint data for existing customers is being entered followed system, followed with a screening of those prints, if matching prints are found under different names, the matching accounts are sorted and entered onto the note pad file as a "rider". The flagged accounts are then distributed to authorized personnel in a queuing system for further screening, and a letter is sent to the owners of all accounts explaining that there is a identification problem that must be resolved before the accounts can be used. Only after screening can the accounts be put back into the system as legitimate accounts. Until then the accounts stay as inactive accounts on the system. If a user tries to use one of the inactive accounts before it has been marked as valid, the merchant is instructed to contact an employee who informs the customer that there is a pending identification problem which the customer needs to take care of and that the account is inactive and an authorization cannot be given at that time. A notation of is then recorded onto a rider note pad file and is shared on all of the regional clearing note pad files. If after this incident and being advised by an employee that the customer should refrain from using that card, if the customer attempts to use the card again, approval is denied and local law enforcement authorities are notified of a potential fraud.

Rider note pad entries are similar to regular note pad entries but are not time controlled. Rider files are integrated with the flagged user files, which stay in the system as inactive accounts for a predetermined number of days from time of notification of the user. Typically, a legitimate customer responds in a short period of time. If the customer has not responded or made an effort to correct the problem, then the account is classified as fraudulent, removed from the system, and all of the information is transferred to the F file. When a flagged account drops out of the system, the corresponding rider file also drops out of the note pad file. No other steps can override this precedence by the rider entries in the note pad. If at some time later the card is used again, the corresponding account will not exist in the system, and approval is not granted.

Counterfeit credit cards will not work on the preferred system, since approval is not given for cards without corresponding fingerprints which match at both merchant site and the system, along with persónal identification information. If a counterfeit card has been produced using an existing legitimate account number, then the prints on file for that account would not match those of the perpetrator.

Figure 10:
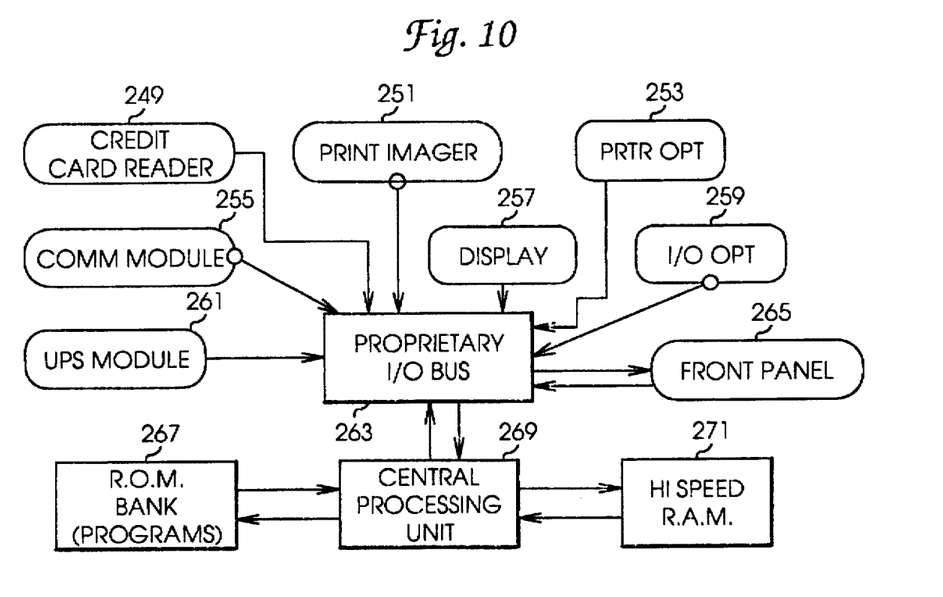
FIG. 10 is a block diagram of the schematic of a card verification apparatus compatible with the present invention.

The imaging device at the merchant site may be similar to the one used at the financial institution. The unit preferably scans the fingerprint of a finger that has been placed on it, translates it into a computer readable language, and then transfers the information over communication lines to the centralized system at the main clearing facility, as shown by FIG. 10. A microprocessor or other such processor 269 with ROM 267 and high-speed RAM 271 connect to a data I/O bus 263 powered by a UPS 261. The processor 269 processes data going to and coming from a front panel 265, a display 257, printer 253 and other optional I/O devices 259. A card reader 249 is typically also connected to the data bus 263 for reading account information encoded on a credit card. A fingerprint image scanner 251 reads a customer's fingerprint, while a communication module 255, typically comprising a modem, sends and receives information to and from remote devices via standard telephone lines, or other such communication lines.

The imaging device is the remote field input device for all customer transactions. Input is a credit card or other such card provided by a customer. The card reader preferably reads and translates card account information into binary data that is routed to the processor 269 via data bus 263. Under ROM based, RAM resident program control, the data is routed to the communication module 255 and forwarded to the central system containing various databases. This packet of data contains customer credit card data as well as fingerprint information obtained by prompting the customer via LED or other indication means on front panel 265. Upon activation of the fingerprint imaging scanner 251, the fingerprint information is via a grid system converted into a binary format, and along with credit card account information is routed together for verification.

The UPS module 261 insures that in the event of power loss that existing transactions can be completed and a graceful system shutdown occurs. The UPS module 261 is integrated into the data I/O bus 263 design and under processor 269 control alerts the merchant via the front panel 265 when power may be a problem.

The ROM memory 267 contains operational programs that are shadowed in the high speed RAM 271 for optimum speed. The data I/O bus 263 design includes a separate processor for allowing I/O functions such as print imaging and communications to take place in parallel to program operations. There are no processor wait states required due to the coprocessed data I/O bus 263 and the use of high speed RAM 271. The RAM used here is preferably in the 20 nanosecond range.

The printer module 253 allows an audit trail of unit activity, and can be paper or microfiche. The spare I/O option 259 is reserved for future customer enhancements. One skilled in the art will recognize that other equivalent hardware may be substituted for the above without loss of generality.

The merchant runs a customer's credit card through the card reading equipment 249, which allows the merchant access to the clearing house of the financial institution via the communication module 255. As soon as the customer is ready to take care of the charge, the customer places a finger on a scanning surface 251 instead of or in addition to signing a voucher. Upon a completed and approved charge the merchant then gives the customer a receipt printed by printer 253, just as is currently done. The process of taking fingerprints on the imaging device is automatic and does not involve any action on part of the merchant.

Figure 11:
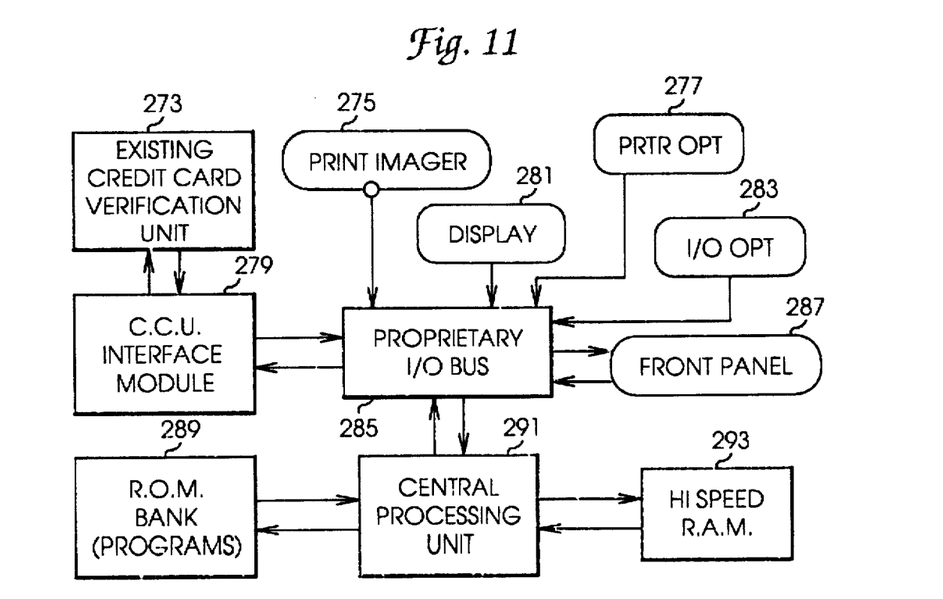
FIG. 11 is a block diagram of the schematic of a card verification upgrade apparatus compatible with the present invention.

A unit similar to the merchant unit is used to upgrade existing credit card verification equipment at the merchant site, as shown by FIG. 11. A microprocessor or other such processor 291 with ROM 289 and high-speed RAM 293 connect to a data I/O bus 282. The processor 291 processes data going to and coming from a front panel 287, a display 281, printer 277 and other optional. I/O devices 283. A credit card unit interface module 279 interfaces to an existing credit card reader and verification unit 273 is also connected to the data bus 285 for reading account information encoded on a credit card. A fingerprint image scanner 275 reads a customer's fingerprint.

In merchant sites such as restaurants, it may not be practical to have a stationary imaging system. For such merchants, a stationary base unit is placed wherever is convenient for the establishment, and a separate mobile hand-held scanning unit is provided to bring to customers.

Figure 8:
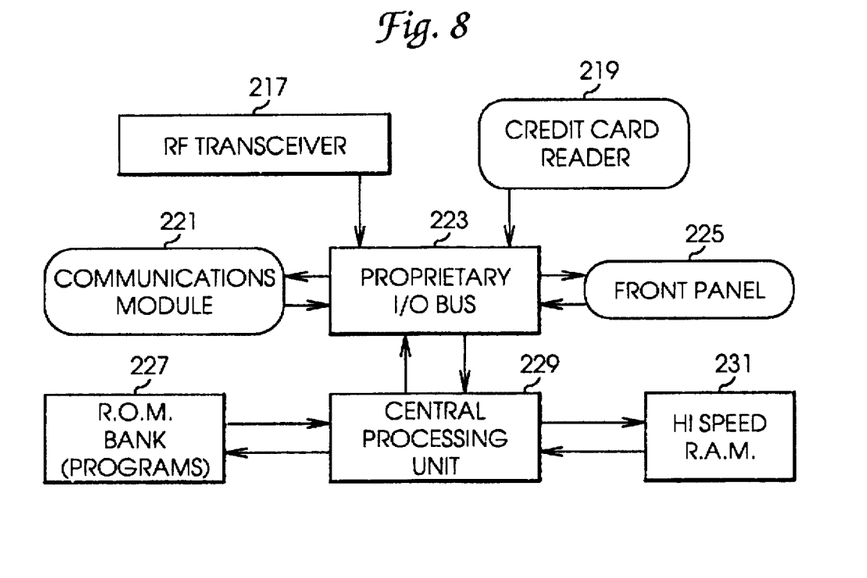
FIG. 8 is a block diagram of the schematic of a mobile card verification base unit apparatus compatible with the present invention.

A base unit compatible with the present invention is shown in FIG. 8. A microprocessor or other such processor 229 with ROM 227 and high-speed RAM 231 connect to a data I/O bus 223. The processor 229 processes data going to and coming from a front panel 225. A credit card reader 219 is also connected to the data bus 223 for reading account information encoded on a credit card. A communication module 221, typically comprising a modem, sends and receives information to and from remote devices via standard telephone lines, or other such communication lines. A radio frequency (RF) transceiver 217 sends and receives data to and from the mobile hand-held unit via radio waves.

The base unit serves as the central unit connected to communication lines for the purpose of opening accounts, verifying identity, and communicating with the portable hand-held units in developing account charge information and updating central account information.

This card reader 219 is typically used to access the processor 229 via the data I/O bus 223 to open up communications programs stored in ROM 227 but later transferred to high speed RAM 231. Upon executing this program, credit card account information is preferably routed to the communication module 221 to establish a connection between a remote mainframe and the base unit via a telephone line. This process happens parallel to RF communication via the RF transceiver 217 and a mobile hand-held unit. Under separate program control, the hand-held mobile unit typically is exchanging fingerprint information and transaction amounts with the base unit for routing through the data I/O bus 223. Transmission data is typically sent via the communication module 221 to a remote mainframe computer.

Front panel operator controls typically comprise a series of fingerprint imaging status lights, error lights, transmission lights and a simple LCD display unit, all receiving data and control from the processor 229 via the data I/O bus 223. One skilled in the art will recognize that other equivalent hardware may be substituted for the above without loss of generality.

Figure 7:
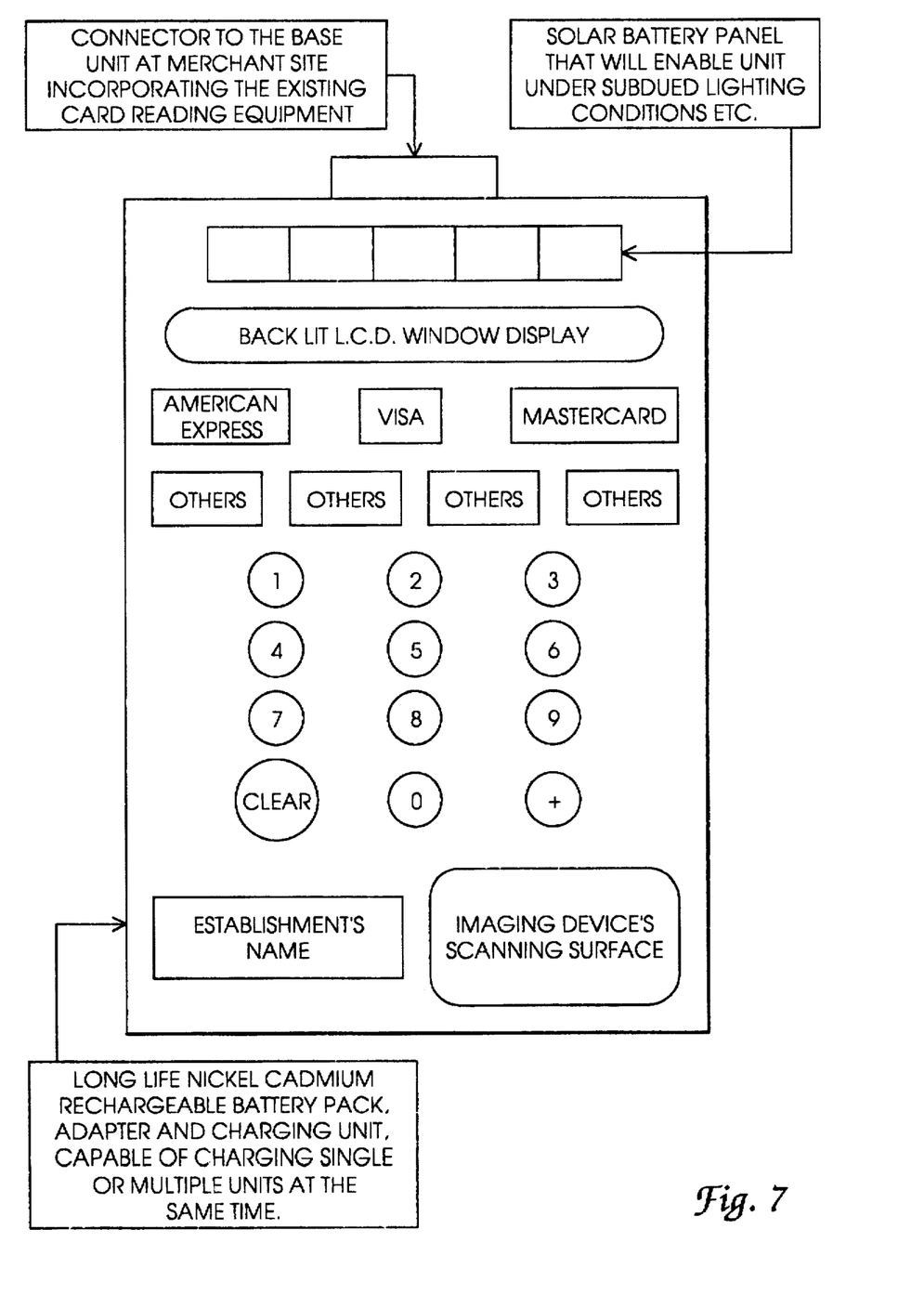
FIG. 7 is view of the front of a hand-held mobile card verification apparatus compatible with the present invention.
Figure 9:
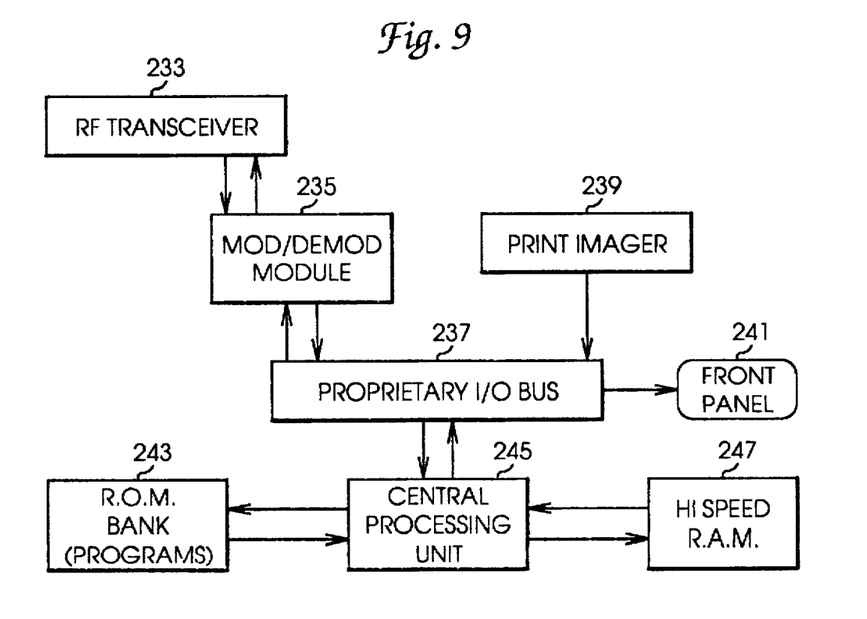
FIG. 9 is a block diagram of the schematic of a mobile card verification apparatus compatible with the present invention.

Much of the working components of the mobile hand-held unit are similar to the stationary merchant scanning unit. The units are designed with numbers from 0 through 9, and with buttons identifying the types of credit cards the merchant accepts. The display of the unit may be back lit, as shown in front panel view of FIG. 7. A microprocessor or other such processor shown in FIG. 9, 245 with ROM 243 and high-speed RAM 247 connect to a data I/O bus 237. The processor 245 processes data going to and coming from a front panel 241. A fingerprint imaging device 239 is also connected to the data bus 237 for scanning and encoding a customer's fingerprint. A communication modulation/demodulation module 235 encodes and decodes information to be sent and received to and from the base unit via an RF radio transceiver 233.

The present invention is to be limited only in accordance with the scope of the appended claims, since others skilled in the art may devise other embodiments still within the limits of the claims.

What is claimed is:

1. A method for adding a user record to a centralized computer database using a fingerprint form comprising the steps of:

(a) storing user account information in the user record in an electronic format in a computer database file;

(b) marking the user record as being incomplete;

(c) generating the fingerprint form by pre-encoding the user account information on the fingerprint form and providing the fingerprint form to a user, wherein the fingerprint form comprises an area for fingerprints;

(d) obtaining on the fingerprint form a fingerprint from the user;

(e) reading and electronically encoding a user fingerprint from the fingerprint form and storing the encoded user fingerprint in an electronic format in the computer database file, and associating the encoded user fingerprint with the encoded user account information in the user record in the computer database file;

(f) analyzing the user fingerprint, and when the user fingerprint is illegible, notifying the user that the user fingerprint is illegible, providing a replacement fingerprint form to the user, and terminating the method;

(g) when the user fingerprint is legible, searching and comparing the user fingerprint to all previously stored user fingerprints in the computer database file for a match;

(h) when there is a match between the user fingerprint and one of the previously stored user fingerprints in the computer database file, marking the user records associated with the user fingerprint and the previously stored user fingerprint as frozen, notifying the associated users, and terminating the method; and (i) when there is no match between the user fingerprint and one of the previously stored user fingerprints in the computer database file, marking the user record stored in the computer database file as complete.

2. The method of claim 1, wherein the computer database file comprises a G file representing good user entries and a F file representing fraudulent user entries.

3. The method of claim 1 further comprising the step of, when there is a match between the user fingerprint and one of the previously stored user fingerprints in the computer database file, storing the user fingerprint in a user record in an electronic format in a temporary note pad computer database file so that the user fingerprint stored in the temporary note pad can be used for geographically tracking fraudulent user activities.

4. The method of claim 3, wherein:

(a) the temporary note pad computer database file further comprises a rider file for temporarily storing old user account information; and (b) the rider file comprises means for being accessed upon each user account transaction.

* * * * *